(12) United States Patent
Miller et al.

(10) Patent No.: US 11,541,990 B2
(45) Date of Patent: Jan. 3, 2023

(54) SINGLE SPOKE SPINNER SUPPORT

(71) Applicant: Textron Innovations Inc., Providence, RI (US)

(72) Inventors: Gary Miller, North Richland Hills, TX (US); Ken Shundo, Keller, TX (US); Diana R. Tinlin, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 244 days.

(21) Appl. No.: 17/018,562

(22) Filed: Sep. 11, 2020

(65) Prior Publication Data

US 2022/0081106 A1 Mar. 17, 2022

(51) Int. Cl.
*B64C 11/14* (2006.01)
*B64C 29/00* (2006.01)

(52) U.S. Cl.
CPC .......... *B64C 11/14* (2013.01); *B64C 29/0033* (2013.01)

(58) Field of Classification Search
CPC ... F16C 32/0406; B64C 11/14; B64C 29/0033
See application file for complete search history.

(56) References Cited

U.S. PATENT DOCUMENTS

| | | | | |
|---|---|---|---|---|
| 1,927,921 A | * | 9/1933 | Courtney | B64C 11/14 123/41.58 |
| 2,346,680 A | * | 4/1944 | Elwood | B64C 11/14 416/245 R |
| 2,580,789 A | * | 1/1952 | Judd | B64C 11/14 416/239 |
| 2010/0133838 A1 | * | 6/2010 | Borgen | F03D 1/06 290/55 |
| 2017/0334567 A1 | * | 11/2017 | Plickys | B64D 15/12 |
| 2018/0016989 A1 | * | 1/2018 | Abe | F02C 7/36 |
| 2019/0337628 A1 | * | 11/2019 | Torske | B64D 15/166 |
| 2021/0147073 A1 | * | 5/2021 | Ries | B64C 27/78 |
| 2022/0043465 A1 | * | 2/2022 | Vander Mey | B64C 27/021 |

FOREIGN PATENT DOCUMENTS

FR 3107309 A1 * 8/2021 ............. F02C 7/045

* cited by examiner

*Primary Examiner* — Joshua J Michener
*Assistant Examiner* — Cindi M Curry
(74) *Attorney, Agent, or Firm* — Shackelford, Bowen, McKinley & Norton, LLP

(57) ABSTRACT

A magnetic spacer system for a spinner of a rotorcraft includes a first ring of a plurality of magnets secured to the spinner and having an inner surface facing radially inward, and a second ring of a plurality of magnets secured to a nacelle of the rotorcraft and having an outer surface facing radially outward. The first and second rings of multiple magnets are arranged concentrically, and a portion of the inner surface of the first ring of a plurality of magnets and a portion of the outer surface of the second ring of a plurality of magnets have the same polarity to repel one another. In other aspects, the magnetic spacer system may be replaced by a low-friction system.

17 Claims, 5 Drawing Sheets

SINGLE SPOKE SPINNER SUPPORT

TECHNICAL FIELD

The present disclosure relates generally to a spinner fairing that covers a rotor system and more particularly, but not by way of limitation, to a spinner fairing that includes a single spoke-spinner support.

BACKGROUND

Spinner fairings, sometimes simply referred to as "spinners", are often employed to reduce the overall aerodynamic drag of an aircraft. Conventional spinners used with rotor systems (e.g., a tilt rotor system) may be in a fixed orientation with respect to a mast or nacelle. Spinners must be large enough to encapsulate various components of the rotor system (e.g., yoke, pitch links, etc.); however, in most cases, minimizing the size of the spinner is preferable to limit the amount of drag generated by the spinner. In addition to providing enough space for components of the rotor system itself, additional hardware to secure the spinner to the rotor system must be accounted for. Conventional spinners rely upon multiple spokes/supports to secure the spinner to the rotor system. It can be very difficult to route a spoke through the various rotor system components to both provide adequate support for the spinner while simultaneously allowing for proper range of motion of the rotor system components during operation (e.g., flapping, feathering, coning, etc.).

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An example of a rotorcraft includes a spinner configured to cover at least a portion of a rotor system of the rotorcraft. The spinner includes a nose cone secured to the rotor system via a spinner spoke. The lower half of the spinner assembly is centered by the use of a spacer system in which a replaceable wearable pad that is installed on the inside of the spinner panels, facing radially inward and the nacelle side with a solid metal ring on the outer surface of the nacelle facing radially outward. As the spinner rotates and becomes slightly off center, the wear pads will interact with solid ring on the nacelle to keep the spinner centered as it rotates. As more hours accrue on the aircraft and as the wear pads are worn to a minimum thickness, they are replaced as necessary.

Another example of a spinner centering system includes a first ring of a plurality of magnets secured to the spinner and having an inner surface facing radially inward. The rotorcraft includes a nacelle that includes a second ring of a plurality of magnets. The second ring of a plurality of magnets includes an outer surface facing radially outward. The first ring of a plurality of magnets and the second ring of a plurality of magnets are arranged concentrically and a portion of the inner surface of the first ring of a plurality of magnets and a portion of the outer surface of the second ring of a plurality of magnets have the same polarity to repel one another.

Another example of a spacer system is similar to the system described in section [0005], but incorporates the use of a electro-magnet mounted to the nacelle side, which would allow the intensity of the magnetic field to vary. The intensity of the magnet could be controlled either manually or by the computer to allow for better control of the spinner during flight.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
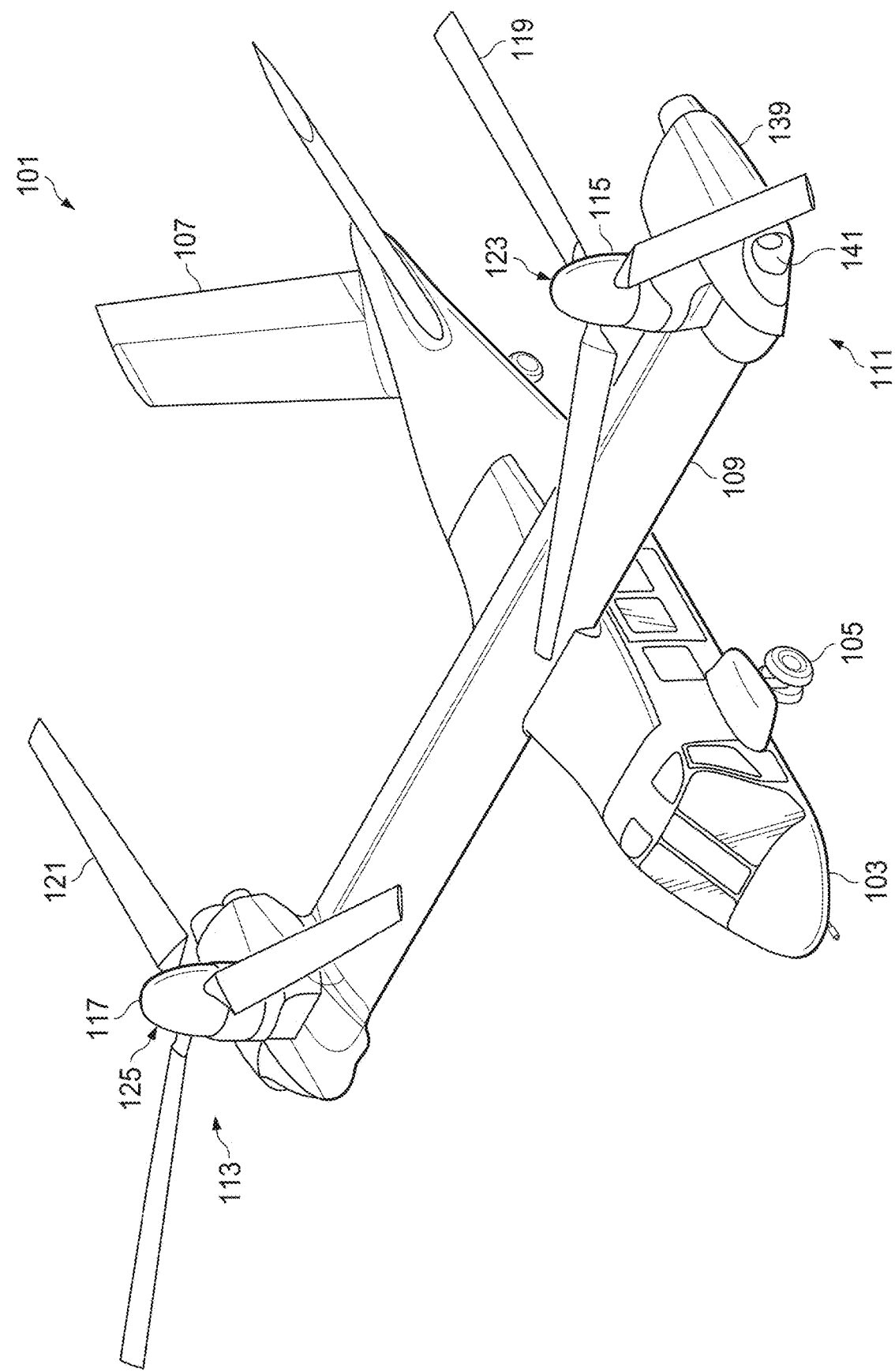
FIG. 1 is a perspective view of a tiltrotor aircraft in helicopter mode, according to aspects of the disclosure.

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
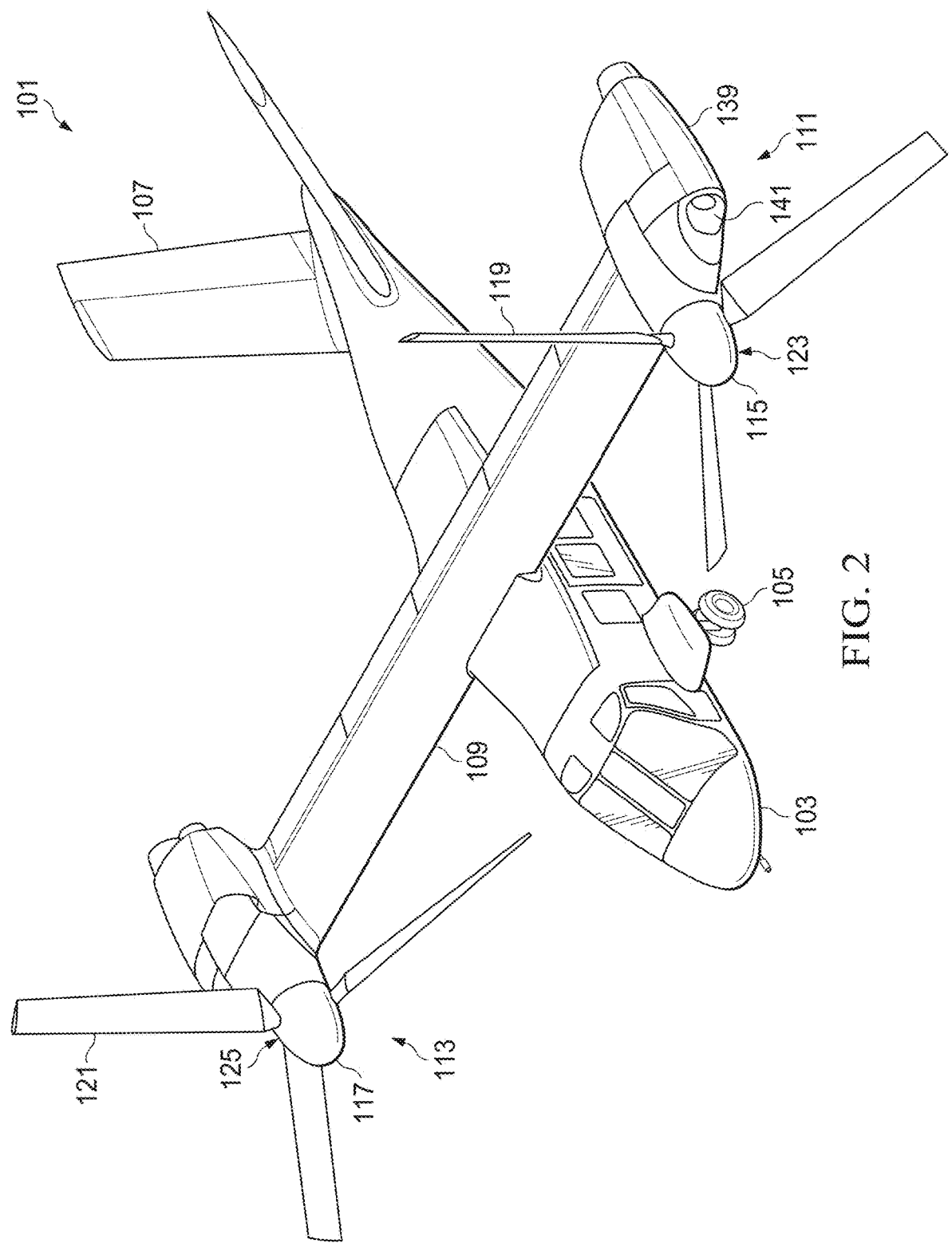
FIG. 2 is a perspective view of a tiltrotor aircraft in airplane mode, according to aspects of the disclosure.

FIGS. 1 and 2 illustrate a tiltrotor aircraft 101, according to aspects of the disclosure. Tiltrotor aircraft 101 includes a fuselage 103, a landing gear 105, a empennage 107, a wing 109, a rotor system 111, and a rotor system 113. Each rotor system 111, 113 includes a fixed engine 139 and a rotatable proprotor 115, 117, respectively. Each proprotor of rotatable proprotors 115, 117 includes a plurality of rotor blades 119, 121, respectively, associated therewith. Each rotor system 111, 113 includes a spinner 123, 125, respectively, that provide an aerodynamic cover for components of proprotors 115, 117. The position of proprotors 115, 117, as well as the pitch of rotor blades 119 and 121, can be selectively controlled in order to selectively control direction, thrust, and lift of tiltrotor aircraft 101.

FIG. 1 illustrates tiltrotor aircraft 101 in helicopter mode, in which proprotors 115, 117 are positioned substantially vertical to provide a lifting thrust. FIG. 2 illustrates tiltrotor aircraft 101 in an airplane mode in which proprotors 115, 117 are positioned substantially horizontal to provide a forward thrust in which a lifting force is supplied by wing 109. It should be appreciated that tiltrotor aircraft 101 can be operated such that proprotors 115, 117 are selectively positioned between airplane mode and helicopter mode, which can be referred to as a conversion mode.

Rotor system 113 is substantially symmetric to rotor system 111; therefore, for sake of efficiency, certain features will be discussed only with regard to rotor system 111. However, one of ordinary skill in the art would fully appreciate an understanding of rotor system 113 based upon the disclosure herein of rotor system 111. Further, rotor systems 111, 113 are illustrated in the context of tiltrotor aircraft 101; however, rotor systems 111, 113 can be implemented on other tiltrotor aircraft. For example, an alternative embodiment may include a quad tiltrotor that has an additional wing member aft of wing 109; the additional wing member can have additional rotor systems similar to rotor systems 111, 113. another embodiment, rotor systems 111, 113 can be used with an unmanned version of tiltrotor aircraft 101. Further, rotor systems 111, 113 can be integrated into a variety of tiltrotor aircraft configurations. Additionally, other rotor systems are contemplated.

Referring to tiltrotor aircraft in general, each rotor system 111, 113 includes a mast driven by a power source (e.g., engine 139). Each rotor system 111, 113 also includes a yoke connected to the mast, with rotor blades indirectly connected to the yoke via bearings. The bearings may be, for example, elastomeric bearings constructed from a rubber type material that absorb vibration. The bearings may include inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other of the bearings. The bearings accommodate forces acting on the rotor blades allowing each rotor blade to flex with respect to the yoke/mast and other rotor blades. The weight of the rotor blades and the lift of rotor blades generated by action of the rotor blades may result in transverse forces on the yoke and other components. Examples of transverse forces include forces resulting from flapping and coning of the rotor blades. Flapping can refer to an up-and-down movement of a rotor blade positioned at a right angle to the plane of rotation or can refer to a gimballing of the hub, a teetering rotor, or a rotor incorporating a flexure. Coning generally refers to an upward flexing of a rotor blade and/or yoke due to lift forces acting on the rotor blade. Generally speaking, the hub is not rigidly connected to the mast and a differential coning of the rotor blades can cause the hub to tilt relative to the mast.

The rotor blades may be subject to other forces, such as axial, lead/lag, and feathering forces. Axial forces generally refer to a centrifugal force on the rotor blades resulting from rotation of the rotor blades. Lead and lag forces generally refer to forces resulting from a horizontal movement of the rotor blades about a vertical pin that occur if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, each mast receives torque from the power source and rotates the yoke. Rotation of the yoke causes the rotor blades to rotate with the mast and yoke.

Figure 3:
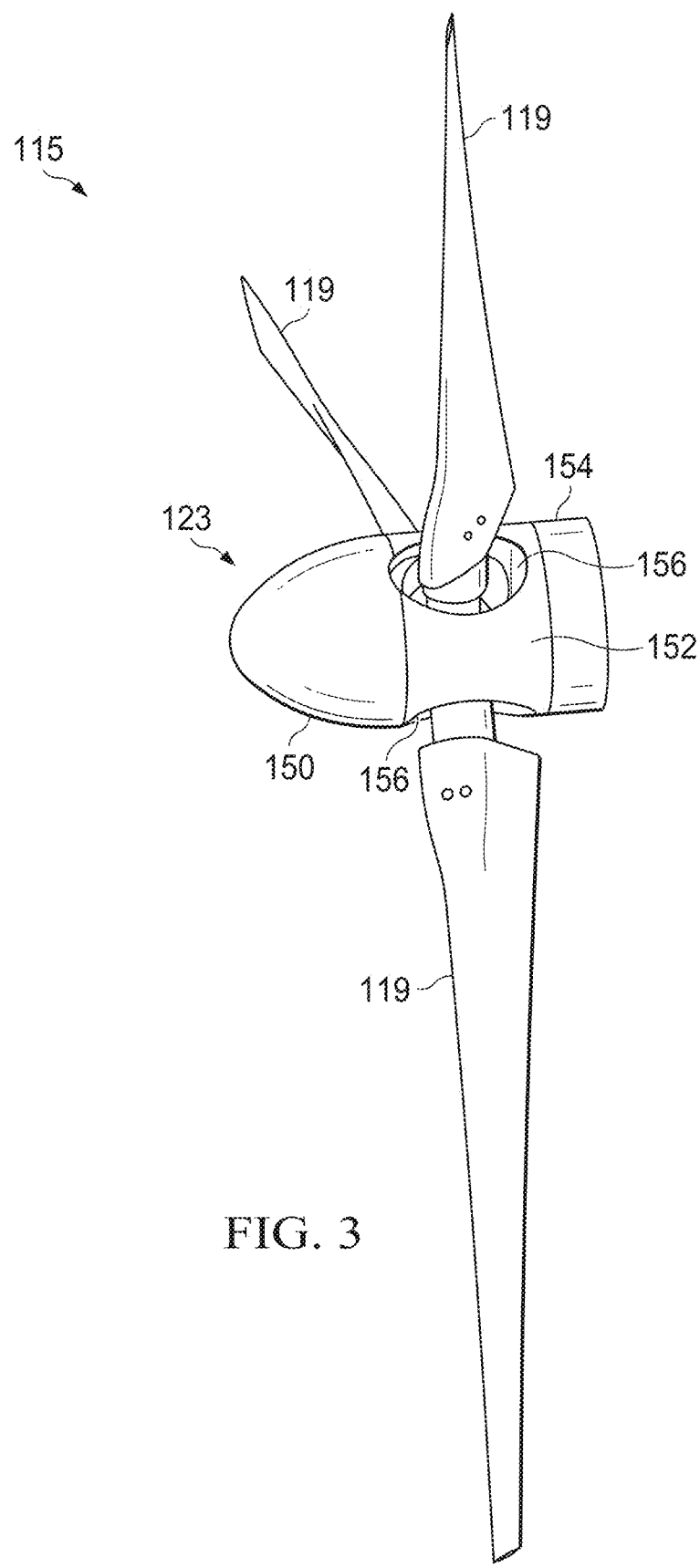
FIG. 3 illustrates a portion of a rotor and nacelle airframe system of a tiltrotor aircraft, according to aspects of the disclosure.

FIG. 3 is a close-up view of a conventional proprotor 115 of rotor system 111, according to aspects of the disclosure. As illustrated in FIG. 3, spinner 123 is formed from two components, a nosecone 150 and a set of three individual rotor spinner panels 152. Nosecone 150 has an aerodynamic shape to smoothly direct air around the central portion of proprotor 115. Rotor spinner panels 152 sit between nosecone 150 and a nacelle 154. Rotor spinner panels 152 include openings 156 through which rotor blades 119 extend. Spinner 123 is connected to and rotates with proprotor 115. Nacelle 154 is fixed in place and does not spin.

Figure 4:
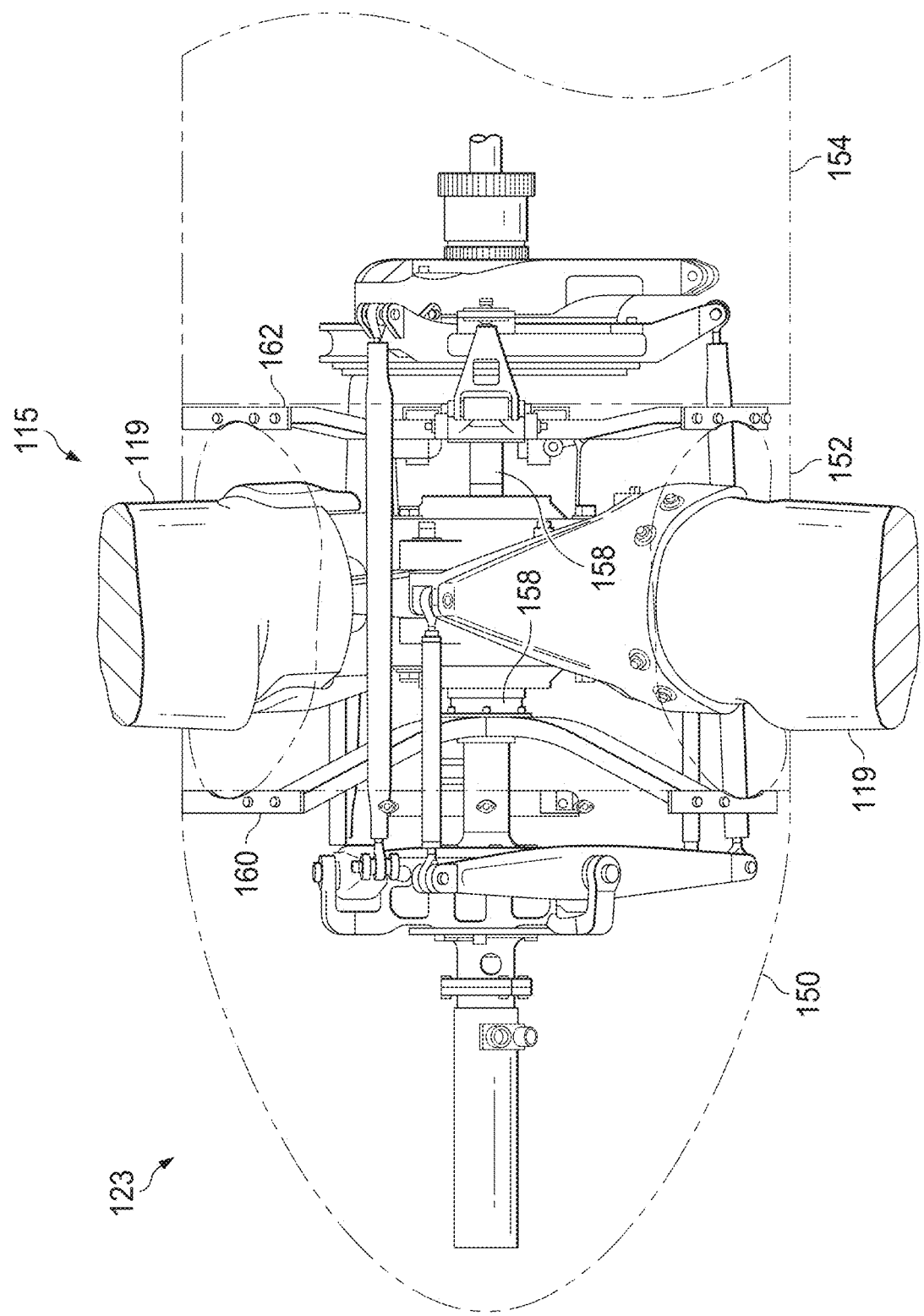
FIG. 4 illustrates a side view of a conventional spinner of a tiltrotor aircraft.

FIG. 4 is a perspective view of spinner 123. As illustrated in FIG. 4, nosecone 150 and rotor spinner panels 152 are secured to portions of a mast 158 of proprotor 115 by an upper spinner spoke 160 and a lower spinner spoke 162. Each of spinner spokes 160, 162 includes three arms that span from mast 158 to an inside edge of nosecone 150 and rotor spinner panels 152, respectively (the third arm of spinner spokes 160, 162 extends into the page of FIG. 4). As discussed above, spinner 123 is designed to be as small as is practical. As a result, space within spinner 123 is at a minimum. Due to the space constraints within spinner 123, it can be difficult to package the various parts of proprotor 115. As illustrated in FIG. 4, various linkages and actuators are secured between mast 158 and rotors blades 119. To provide rotors blades 119 adequate space to articulate, spinner spokes 160, 162 must be carefully routed and threaded around other components of proprotor 115. The inclusion of spinner spokes 160, 162 thus reduces the amount of space available to package the components of proprotor 115. The instant disclosure is directed to a system of restraining the movement of rotor spinner panel 152 without the need of lower spinner spoke 162.

Figure 5A:
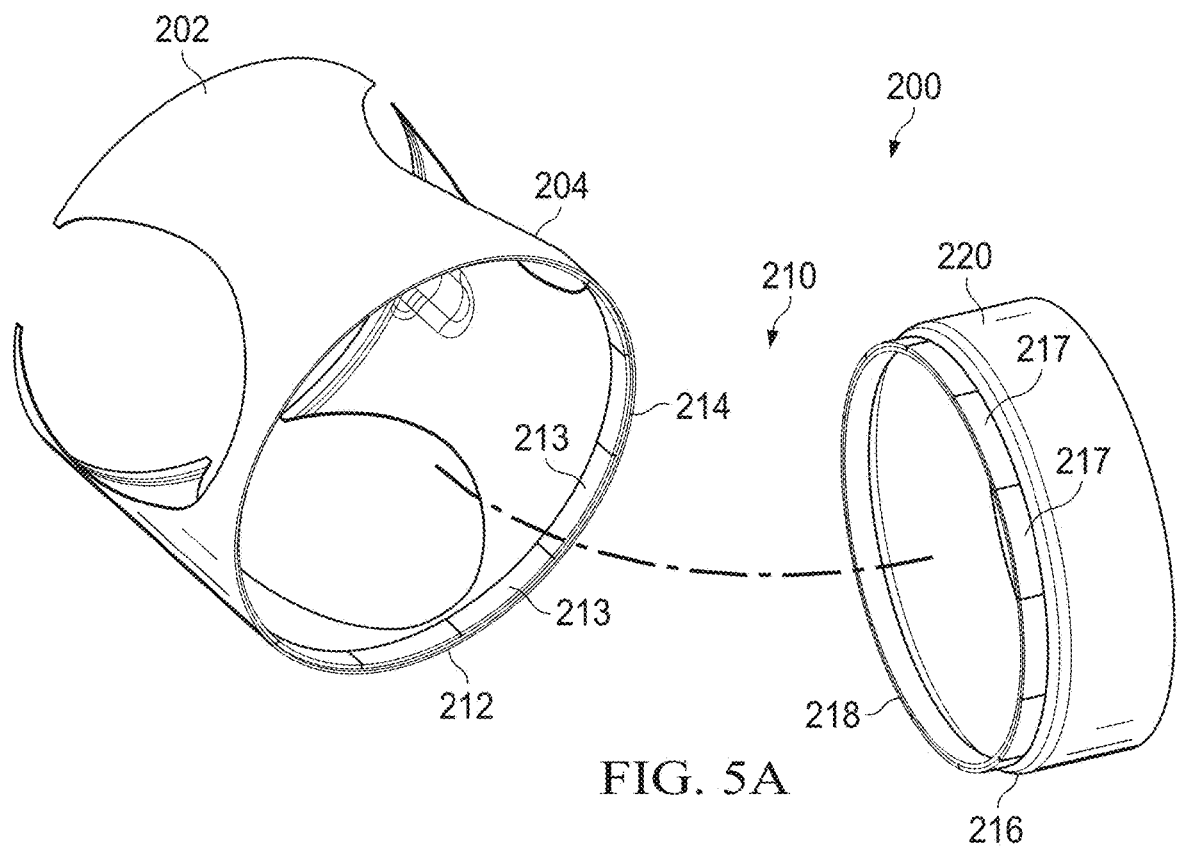
FIGS. 5A and 5B illustrate a single-spoke system for securing a spinner to a proprotor.
Figure 5B:
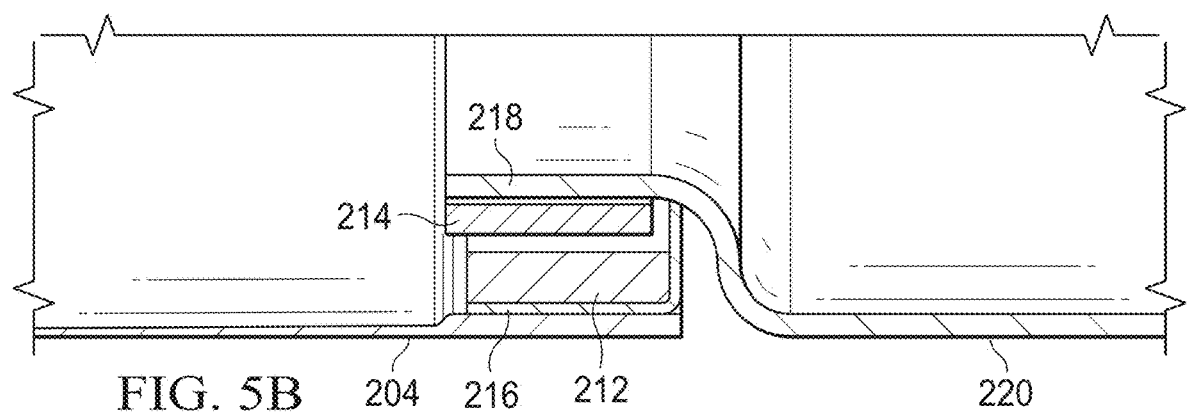

FIGS. 5A and 5B illustrate a single-spoke system 200 for securing a spinner 202 to a proprotor (e.g., proprotor 115), according to aspects of the disclosure. FIG. 5A illustrates spinner 202 separated from a nacelle 220 and FIG. 5B is a close-up view of a magnetic spacer system 210. Spinner 202 is similar to spinner 123 except that lower spinner spoke 162 has been eliminated and rotor spinner panel 152 has been replaced with a rotor spinner panel 204. Upper spinner spoke 160 remains in place as the only spoke to secure nosecone 150 and the upper portion of rotor spinner panel 204 to proprotor 115. Lower spinner spoke 162 has been replaced by magnetic spacer system 210.

Magnetic spacer system 210 includes a ring of multiple magnets 212 affixed to an inside edge 214 of rotor spinner panel 204 and a ring of multiple magnets 216 that is affixed to an outside edge 218 of a nacelle 220. The multiple magnets are at least a plurality (i.e., two or more) in accordance with desired design considerations. Nacelle 220 is similar to nacelle 154, but includes ring of a multiple magnets 216. In the aspect of FIGS. 5A and 5B, outside edge 218 is offset to have a smaller diameter than the diameter of nacelle 220. The offset allows rotor spinner 204 and nacelle 220 to fit together with an aerodynamic shape. Rings of multiple magnets 212, 216 are designed to repel one another by having polarities that oppose one another (e.g., north poles or south poles of both facing one another). As illustrated in FIGS. 5A and 5B, the outer diameter of ring of a multiple magnets 216 is smaller than the inner diameter of ring of multiple magnets 212 so that rings of multiple magnets 212, 216 may be arranged concentrically. It will be appreciated that rotor spinner 204 and/or nacelle 220 may be modified so that ring of multiple magnets 212 is instead positioned on an outer edge of rotor spinner 204 and ring of a multiple magnets 216 is positioned on an inner edge of nacelle 220. In this aspect, the inner diameter of ring of a multiple magnets 216 is larger than the outer diameter of ring of multiple magnets 212 so that rings of multiple magnets 212, 216 may still be arranged concentrically with an outer face of ring of multiple magnets 212 facing an inner face of ring of multiple magnets 216.

As illustrated in FIG. 5A, ring of multiple magnets 212 is comprised of a plurality of magnets 213 and ring of multiple magnets 216 is comprised of a plurality of magnets 217. In some aspects, each magnet of the plurality of magnets 213 is oriented with the same polarity (e.g., the north polarity of each magnet 213 facing radially outward or radially inward). In some aspects, each magnet of the plurality of magnets 213 is oriented with alternating polarity (e.g., adjacent magnets 213 have opposite polarity). In either aspect, the magnets of the plurality of magnets 213, 217 are arranged so that the faces of radially aligned magnets of rings of multiple magnets 212, 216 have the same polarity so that rings of multiple magnets 212, 216 tend to repel one another. The repelling force keeps rotor spinner 204 centered about outside edge 218 and prevents contact between rotor spinner 204 and nacelle 220. In some aspects, each ring of multiple magnets 212, 216 is formed from a single magnetic strip, with the polarities of rings of multiple magnets 212, 216 arranged to repel one another (e.g., north polarities of both facing each other or north polarities of both facing away from each other).

In other aspects, magnetic spacer system 210 could be replaced with a low-friction system. The low-friction system replaces rings of multiple magnets 212, 216 with low friction pads. An inner ring of low friction pads is secured to outside edge 218 of nacelle 220, and an outer ring of low friction pads is secured to inside edge 214 of rotor spinner 204. The diameter of the inner ring of low friction pads is slightly less than the diameter of the outer ring of low friction pads. The low-friction system permits occasional contact between the inner and outer rings of low friction pads during rotation of the proprotor. The low friction pads may be made of, for example, PTFE coated pads, a thermoplastic such as TORLON, Aluminum-Bronze, Self-Lubricating Aluminum, Steel, Plastic/PEEK, etc.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A magnetic spacer system for a spinner of a rotorcraft, the magnetic spacer system comprising:
    a first ring of a plurality of magnets secured to the spinner and having an inner surface facing radially inward;
    a second ring of a plurality of magnets secured to a nacelle of the rotorcraft and having an outer surface facing radially outward;
    wherein the first ring of a plurality of magnets and the second ring of a plurality of magnets are arranged concentrically and a portion of the inner surface of the first ring of a plurality of magnets and a portion of the outer surface of the second ring of a plurality of magnets have the same polarity to repel one another; and
    a single spoke, wherein the single spoke comprises an upper spinner spoke.

2. The magnetic spacer system of claim 1, wherein the first ring of a plurality of magnets comprises a single magnet strip and the second ring of a plurality of magnets comprises a single magnet strip.

3. The magnetic spacer system of claim 1, wherein the first ring of a plurality of magnets comprises at least two magnets and the second ring of a plurality of magnets comprises at least two magnets.

4. The magnetic spacer system of claim 3, wherein the at least two magnets are arranged around the first ring of a plurality of magnets so that adjacent magnets of the at least two magnets have alternating polarities.

5. The magnetic spacer system of claim 3, wherein the at least two magnets are arranged around the second ring of a plurality of magnets so that adjacent magnets of the at least two magnets have alternating polarities.

6. The magnetic spacer system of claim 1, wherein the second ring of a plurality of magnets is secured to an outer edge of the nacelle that is offset to have a smaller diameter than the nacelle.

7. The magnetic spacer system of claim 1, wherein the spinner comprises:
    a nosecone secured to a rotor system of the rotorcraft via the upper spinner spoke; and
    a rotor spinner panel secured at a first end of the rotor spinner panel to the nosecone and supported at a second end of the rotor spinner panel by the first and second ring of a plurality of magnets.

8. A rotorcraft comprising:
    a spinner configured to cover at least a portion of a rotor system of the rotorcraft, the spinner comprising:
        a nosecone secured to the rotor system via a single spoke, wherein the single spoke comprises an upper spinner spoke; and
        a rotor spinner panel secured to the nosecone at a first end of the rotor spinner panel and comprising a first ring of a plurality of magnets secured to a second end of the rotor spinner panel and having an inner surface facing radially inward;
    a nacelle comprising a second ring of a plurality of magnets, the second ring of a plurality of magnets having an outer surface facing radially outward; and wherein the first ring of a plurality of magnets and the second ring of a plurality of magnets are arranged concentrically and a portion of the inner surface of the first ring of a plurality of magnets and a portion of the outer surface of the second ring of a plurality of magnets have the same polarity to repel one another.

9. The rotorcraft of claim 8, wherein the rotor spinner panel comprises an opening through which a rotor of the rotor system extends.

10. The rotorcraft of claim 8, wherein the first ring of a plurality of magnets comprises a single magnet strip and the second ring of a plurality of magnets comprises a single magnet strip.

11. The rotorcraft of claim 8, wherein the first ring of a plurality of magnets comprises at least two magnets and the second ring of a plurality of magnets comprises at least two magnets.

12. The rotorcraft of claim 11, wherein the at least two magnets are arranged around the first ring of a plurality of magnets so that adjacent magnets of the at least two magnets have alternating polarities.

13. The rotorcraft of claim 11, wherein the second plurality of magnets are arranged around the second ring of at least two magnets so that adjacent magnets of the at least two magnets have alternating polarities.

14. The rotorcraft of claim 8, wherein the second ring of a plurality of magnets is secured to an outer edge of the nacelle that is offset to have a smaller diameter than the nacelle.

15. A magnetic spacer system for a spinner of a rotorcraft, the magnetic spacer system comprising:

a first ring of a plurality of magnets secured to the spinner and having an outer surface facing radially outward;

a second ring of a plurality of magnets secured to a nacelle of the rotorcraft and having an inner surface facing radially inward;

a single spoke, wherein the single spoke comprises an upper spinner spoke; and wherein the first ring of a plurality of magnets and the second ring of a plurality of magnets are arranged concentrically and a portion of the inner surface of the first ring of a plurality of magnets and a portion of the outer surface of the second ring of a plurality of magnets have the same polarity to repel one another.

16. The magnetic spacer system of claim 15, wherein the spinner comprises:

a nosecone secured to a rotor system of the rotorcraft via the upper spinner spoke; and a rotor spinner panel secured at a first end of the rotor spinner panel to the nosecone and supported at a second end of the rotor spinner panel by the first and second ring of a plurality of magnets.

17. The magnetic spacer system of claim 15, comprising:

wherein the first ring of a plurality of magnets comprises at least two magnets and the second ring of a plurality of magnets comprises at least two magnets; and wherein the at least two magnets are arranged around the first ring of a plurality of magnets so that adjacent magnets of the at least two magnets have alternating polarities.

* * * * *